(12) United States Patent
Turek et al.

(10) Patent No.: US 12,055,232 B2
(45) Date of Patent: Aug. 6, 2024

(54) COMPLIANT JOINT DRIVE ASSEMBLY

(71) Applicant: Goodrich Corporation, Charlotte, NC (US)

(72) Inventors: Lukasz Turek, Wroclaw (PL); Piotr Zajac, Wroclaw (PL); Modest Adam Reszewicz, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 37 days.

(21) Appl. No.: 17/592,930

(22) Filed: Feb. 4, 2022

(65) Prior Publication Data

US 2022/0260174 A1    Aug. 18, 2022

(30) Foreign Application Priority Data

Feb. 15, 2021 (EP) .................................... 21461515

(51) Int. Cl.
| | |
|---|---|
| *F16K 31/05* | (2006.01) |
| *F16D 1/10* | (2006.01) |
| *F16K 5/06* | (2006.01) |
| *F16K 31/04* | (2006.01) |
| *F16K 31/60* | (2006.01) |
| *H01B 17/58* | (2006.01) |

(52) U.S. Cl.
CPC ............ *F16K 31/047* (2013.01); *F16D 1/101* (2013.01); *F16K 5/0647* (2013.01); *F16K 31/041* (2013.01); *F16K 31/055* (2013.01); *F16K 31/60* (2013.01); *H01B 17/58* (2013.01)

(58) Field of Classification Search
CPC ...... F16K 31/047; F16K 31/055; F16K 31/60; F16K 31/041; F16K 5/0647; H01B 17/58; F16D 1/10; F16D 1/101; F16D 3/58
See application file for complete search history.

(56) References Cited

U.S. PATENT DOCUMENTS

| | | |
|---|---|---|
| 2,616,273 A | 11/1952 | Pringle |
| 2,716,334 A | 8/1955 | Scott et al. |
| 4,034,575 A | 7/1977 | Barth |
| 4,228,664 A | 10/1980 | McCoy |
| 5,928,083 A | 7/1999 | Monahan et al. |
| 7,717,397 B2 | 5/2010 | Campany et al. |

(Continued)

FOREIGN PATENT DOCUMENTS

| | | |
|---|---|---|
| DE | 1939410 A1 | 2/1971 |
| DE | 102013007126 A1 | 6/2014 |
| FR | 1080977 A | 12/1954 |

OTHER PUBLICATIONS

Abstract for DE102013007126 (A1), 1 Page.

(Continued)

*Primary Examiner* — Marina A Tietjen
(74) *Attorney, Agent, or Firm* — CANTOR COLBURN LLP

(57) ABSTRACT

A dielectric insulating insert assembly arranged to be positioned between a drive shaft and a driven shaft of a motorised drive assembly. The insert includes a body of dielectric material to form an insulating layer and having a non-circular cross-section and configured to engage, respectively, with the drive shaft and the driven shaft in torque transfer engagement, the insulating layer providing a dielectric barrier between the drive shaft and the driven shaft.

7 Claims, 8 Drawing Sheets

(56) References Cited

U.S. PATENT DOCUMENTS

| | | | | |
|---|---|---|---|---|
| 8,172,198 | B2* | 5/2012 | Dorsey | F16K 31/047 |
| | | | | 251/71 |
| 9,718,493 | B2* | 8/2017 | Moriyama | B62D 5/0409 |
| 2008/0041476 | A1 | 2/2008 | Campany et al. | |
| 2013/0341069 | A1 | 12/2013 | Demaretz | |
| 2017/0138408 | A1 | 5/2017 | Ishizaki et al. | |
| 2019/0232470 | A1 | 8/2019 | Xu | |
| 2020/0376635 | A1 | 12/2020 | Raskin et al. | |

OTHER PUBLICATIONS

Abstract of DE1939410 (A1), Published Feb. 18, 1971, 1 Page.
European Search Report for Application No. 21461515.5, mailed Jul. 22, 2021, 9 pages.

* cited by examiner

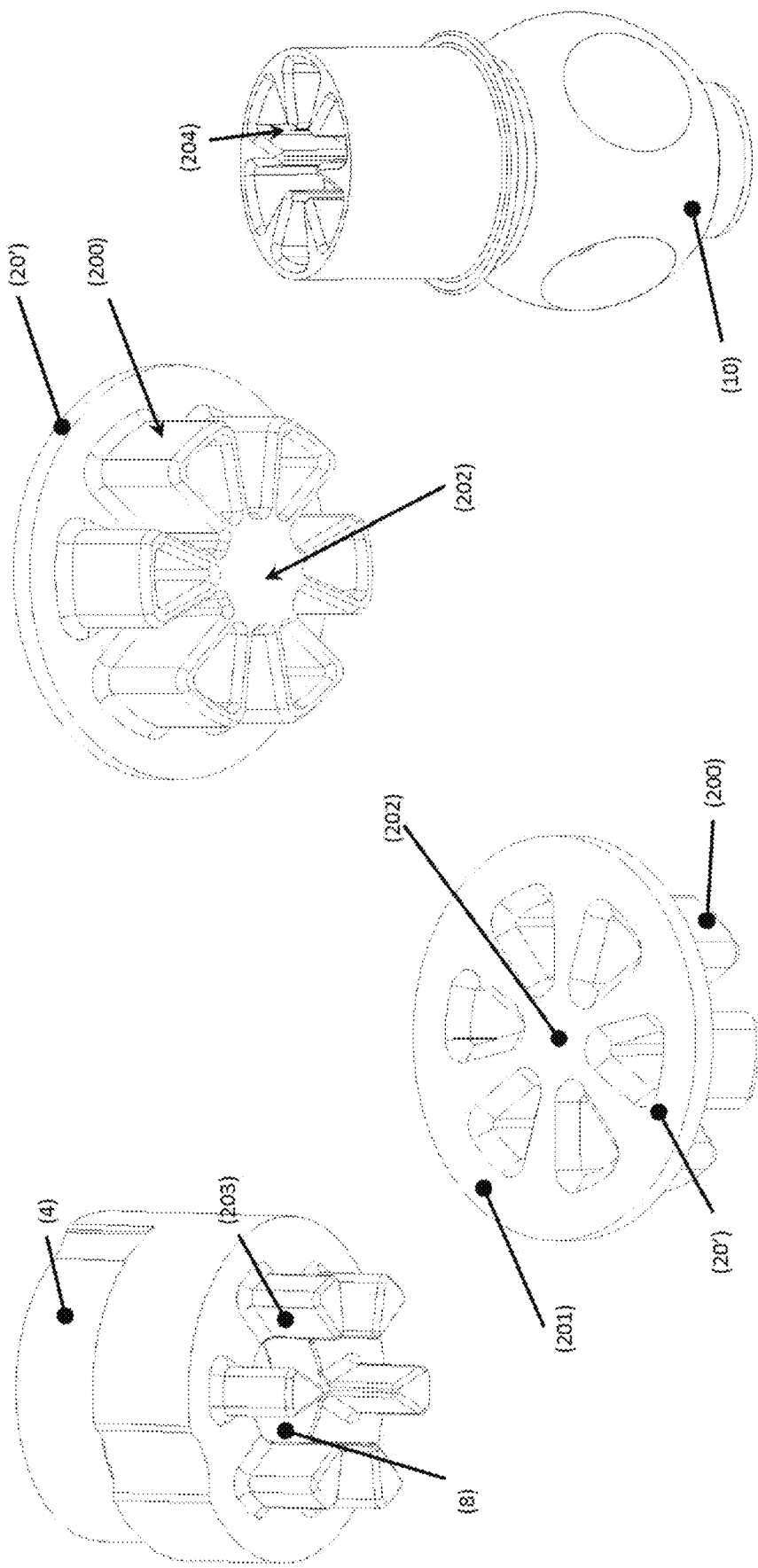

COMPLIANT JOINT DRIVE ASSEMBLY

CROSS-REFERENCE TO RELATED APPLICATIONS

This application claims priority to European Patent Application No. 21461515.5 filed Feb. 15, 2021, the entire contents of which is incorporated herein by reference.

TECHNICAL FIELD

The present disclosure relates to a compliant joint drive assembly whereby torque is transmitted from one end of the assembly to the other, the two ends joined by a compliant joint. An example of such an assembly is a ball valve assembly and, in particular, an assembly for a motorised ball valve.

BACKGROUND

Drive assemblies are used in many applications where a driving force is provided by an actuator such as a manual lever or a motor and the torque from the actuator is transmitted to a movable part along a drive line. For example, a valve may include a valve closure that is rotated by an actuator, either manually by means of a lever or handle or by means of a motor. The drive force from the motor is transmitted to the valve closure along a shaft arrangement, the shaft configured to transfer torque from the actuator to the valve closure. Particularly where the actuator is an electric motor, there is often a need to provide dielectric separation between the electrics and the moveable part especially if the movable part is in e.g. a wet environment, to avoid damage to the 'dry' motor end. On the other hand, it is necessary to maintain torque transmission along the entire drive line.

Ball valves are valves for controlling flow of a fluid e.g. water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g. by means of a handle for rotating the ball. Actuated ball valves are operated by a motor, which moves the ball shaft between the open and closed positions. Ball valves find use in e.g. sanitation or water systems. One application of a valve moved by an electric motor is in an aircraft water supply system. Aircraft commonly have a water supply system for providing potable water to various outlets e.g. to sinks or wash basins, coffee machines, toilets, etc. One or more valve assemblies is provided in the system for the various outlets and at least some of these are driven by an electric motor so that they can be operated remotely or automatically. Such a system is described e.g. in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the two ends of a drive train e.g. between the ball shaft and the electric drive part of a ball valve assembly. The design should be capable of transmitting torque from the actuator end of the drive to the moveable part even in the event that the moveable part experiences some resistance e.g. becomes jammed or frozen such that a short torque peak is experienced.

SUMMARY

According to the disclosure, there is provided a dielectric insulating insert assembly arranged to be positioned between a drive shaft and a driven shaft of a motorised drive assembly, the insert assembly comprising a body of dielectric material to form an insulating layer and having a non-circular cross-section and configured to engage, respectively, with the drive shaft and the driven shaft in torque transfer engagement, the insulating layer providing a dielectric barrier between the drive shaft and the driven shaft.

The insert may comprise a sleeve of dielectric material, the assembly further comprising mating interfaces at the drive shaft and the driven shaft shaped to engage with the insert in torque transfer engagement.

The sleeve may be shaped to define the non-circular cross-section and wherein the mating interfaces comprise a protrusion shaped to correspond to the shape of an interior of the sleeve provided at one of the drive shaft or the driven shaft and a recess shaped to correspond to the shape of an exterior of the sleeve provided at the other of the drive shaft and the driven shaft.

Alternatively, the sleeve may be shaped to define a plurality of sleeve sections each configured to fit around a corresponding one of a corresponding plurality of protrusions at the mating interface of one of the drive shaft or the driven shaft and to fit into a corresponding one of a corresponding plurality of recesses at the mating interface of the other of the drive shaft and the driven shaft.

The insert and the mating interfaces may be configured such that an air gap is defined between the drive shaft and the driven shaft when the shafts and the insert are assembled together.

The insert may comprise a block of dielectric material having the non-circular cross section and having a depth, and wherein the drive shaft and the driven shaft are each provided with a recess to receive the insert in a close fitting arrangement.

The insert may be shaped to define a plurality of lobes.

The insert may be incorporated in a ball shaft assembly comprising a ball shaft as a driven shaft. A motor may be arranged to drive the ball shaft via a cam shaft, as a drive shaft, the insert being located between and in torque transfer engagement with the ball shaft and the cam shaft.

The ball shaft may be part of a water supply system e.g. an aircraft water supply system.

Preferred embodiments will now be described by way of example only, with reference to the drawings.

BRIEF DESCRIPTION OF THE DRAWINGS

FIG. 8 is a perspective view of another example of a dielectric insulator insert for an assembly in accordance with the disclosure.

FIG. 9 shows the insert of FIG. 8 from a different perspective.

DETAILED DESCRIPTION

Figure 1:
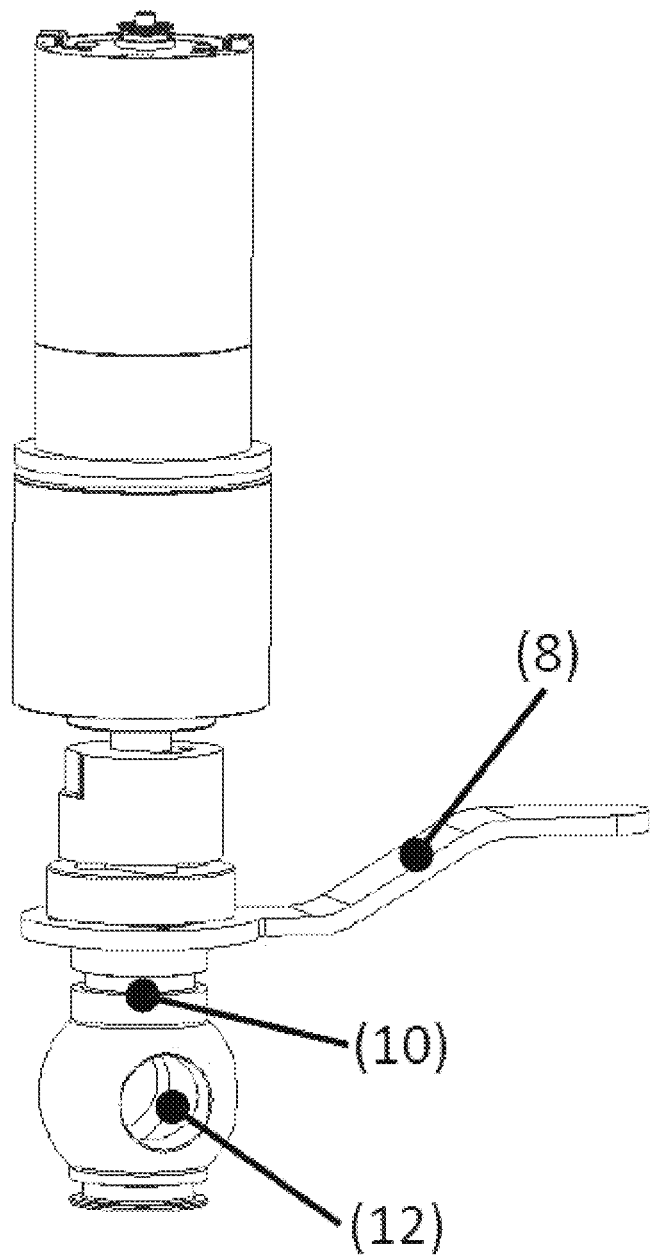
FIG. 1 is a perspective view of a motor driven ball valve assembly that can comprise an insert according to this disclosure.

FIG. 1 is a perspective view of a motorised ball valve assembly including a dielectric insulation component according to the present disclosure.

The operational part of the valve comprises a ball shaft 10 having a hole 12 therethrough defining a flow passage. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft.

Figure 2:
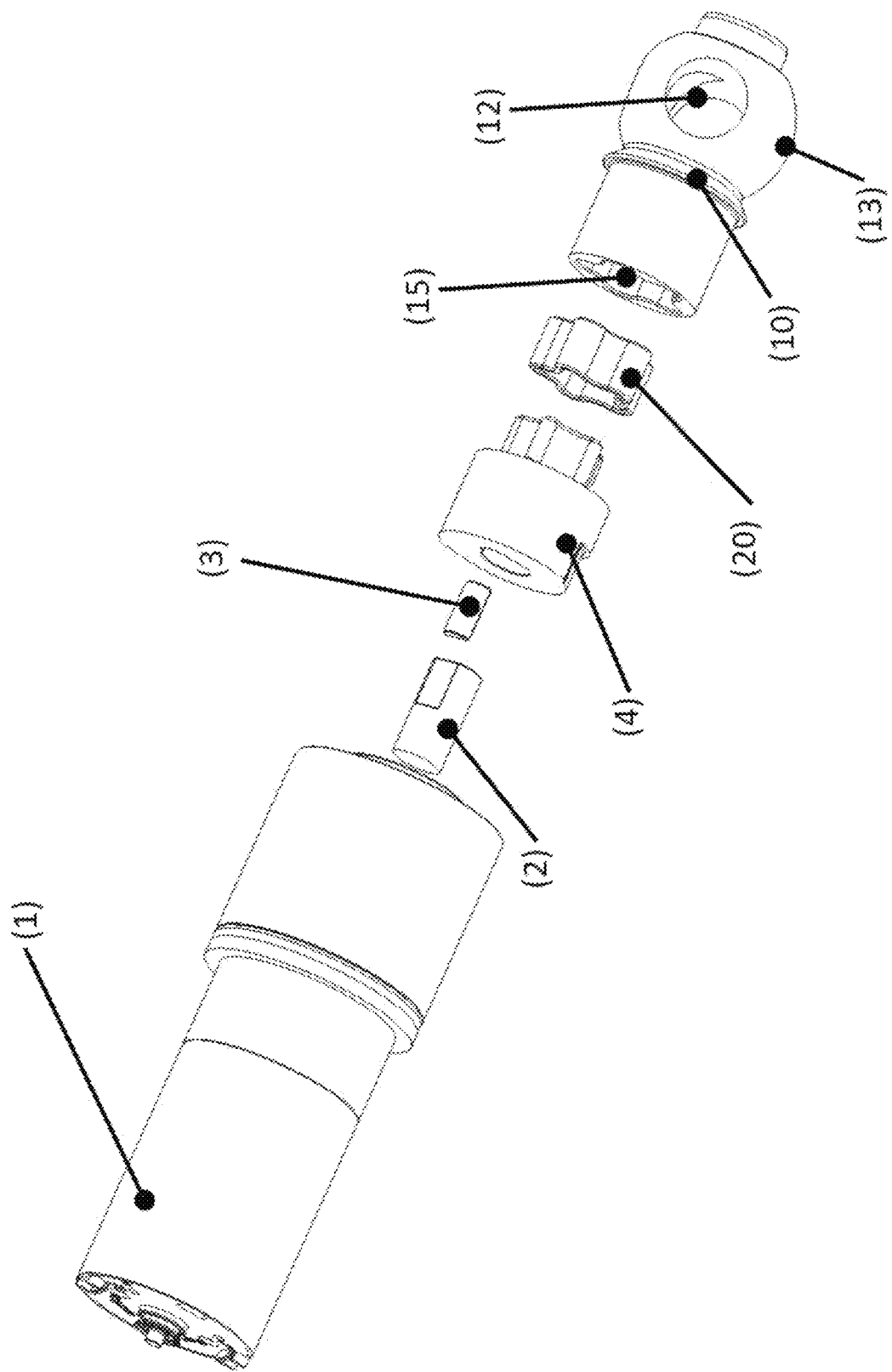
FIG. 2 is an exploded view of the assembly of FIG. 1 according to a first example.
Figure 4:
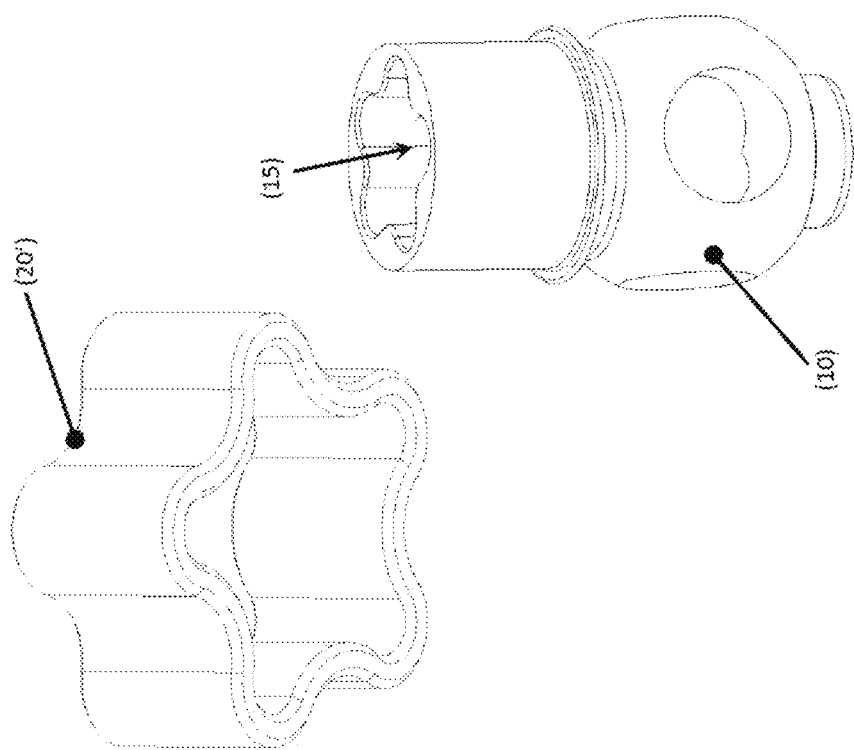
FIG. 4 shows the insert of FIG. 3 from a different perspective.
Figure 3:
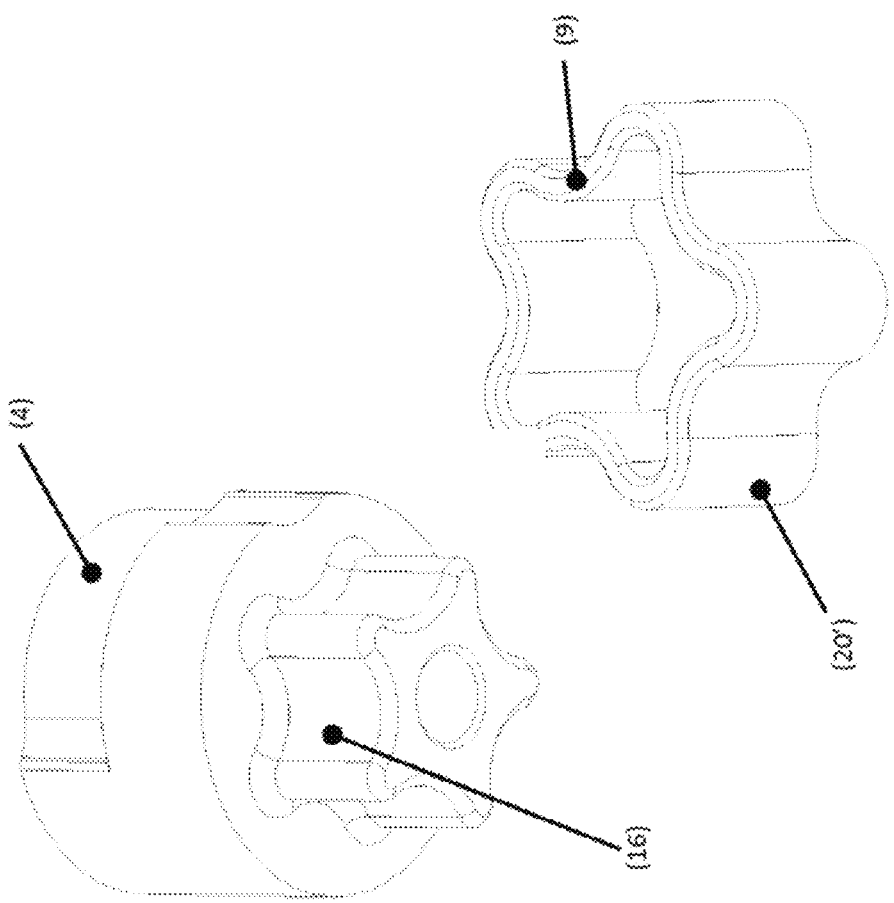
FIG. 3 is a perspective view of one example of a dielectric insulator insert for an assembly in accordance with the disclosure.

In a motorised ball valve, the ball shaft is rotated by means of an electric motor 1. The electric motor 1 drives a cam shaft 4 which engages with the ball shaft 10. In the example shown (see FIG. 2) the cam shaft 4 is provided with a key feature 3 that engages with a D-shaped shaft 2—i.e. a D-shaped shaft component extending from the motor. Rotation of the motor 1 causes rotation of the D-shaft 2 which, in turn, rotates the cam shaft 4 which rotates the ball shaft 10. Seals e.g. O-rings (not shown) are provided around the ball shaft 10 to prevent water passing into the electric part of the assembly. The cam shaft may be provided with indicators such as microswitches (not shown) which can be mounted in recesses or races on the cam shaft 4, or other forms of sensors or indicators, to provide an indication of the angular position of the shaft. These components are standard for a motorised ball valve such as described in U.S. Pat. No. 8,172,198.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle 8 may be provided in close fitting arrangement around the ball shaft so that manual operation of the handle 8 can rotate the ball shaft 10. The handle 8 can be fitted to the ball shaft such that there is a form fitting or frictional engagement between them. Alternatively, a fixing element e.g. a locking pin (not shown) may be provided to secure the handle to the shaft.

As mentioned above, to provide the required strength and to satisfy other standards such as safety, life and hygiene standards, the various shafts and the key feature will often be made of metal e.g. steel. If there is a problem with the electrics at the motor end of the assembly, these would be transmitted directly to the ball shaft and can cause problems such as electric shocks or arcing. To avoid this problem, the assembly of the present disclosure includes a dielectric insulator insert 20 to be fitted between the ball shaft 10 (or, more generally, driven end) and the electric motor 1 (or, more generally, drive end).

The dielectric insulation insert is structured to have dielectric properties and is shaped to provide torque transmission from the electric motor 1 to the ball shaft 10. The shape of the insert should be such as to be able to withstand a short torque peak if the ball shaft end is fixed or blocked. To achieve the torque transfer property, the insert is shaped to define lobes or lugs or ribs or the like that engage into corresponding features provided at the ball shaft and the electric motor. The important thing is that the engagement portion has a shape that can engage with the shafts between which it is located in a manner that torque applied to one of the shafts is transferred to the other shaft via the insert.

The insert according to the disclosure may have different forms, as will be described further below, but it is a discrete component made from a body of dielectric material and has a shape arranged to mate with a corresponding shape on the cam shaft and/or the ball shaft or a bushing 6 provided on the ball shaft 10. The mating structure should be such that any misalignment can be accommodated. The insert is a simple, re-usable component easily manufactured from a readily available starting material which can be appropriately shaped and then easily slotted and secured between the cam shaft (or, more generally drive end) and the ball shaft (or, more generally, driven end) to ensure reliable torque transfer between the ends. In an example, particularly for use in wet or harsh environments, all of the components required for torque transfer are made of steel, particularly stainless steel expect for the dielectric insert 20 which functions as a dielectric barrier between the steel parts.

Whilst the insert may have different shapes, ideally, to ensure reliable torque transmission, the shape should be such as to define multiple points of engagement, as such a structure has been found to transfer the required torque optimally. The camshaft pushes the insert, and the insert pushes the ball shaft. Multiple forces act on distances to the centre of moment. The total moment is the sum of all these moments produced by the individual forces. Such a shape can be realised as, for example, a shaped sleeve (see below with reference to FIGS. 2 to 6); alternatively the insert could be in the form of multiple sleeve-type structures combined into a single insert block (see below with reference to FIGS. 7 to 9), or, as a further modification, the sleeve could be 'filled in' thus forming a block-type insert having a shaped outer surface (see below with reference to FIGS. 10 to 12). In all examples, the insert and the mating parts of the drive end and the driven end should form a tight fit to reduce the effects of backlash and to ensure coaxiality. The inserts can be e.g. machined to shape from tubing or can be moulded to shape.

In one example, as shown in FIGS. 2 to 6, the insert may be formed as a corrugated sleeve 20 of dielectric material that is arranged to be fitted between the cam shaft 4 and the ball shaft 10 to form a dielectric barrier. In this example, the insert 20 is mated with the ball shaft by an interface of the ball shaft 10 or a bushing mounted thereon (not shown here) having a recess 15 or blind bore formed therein that matches the outer shape of the corrugated sleeve 20; the cam shaft 4 is provided with an interface that is formed as a protrusion 16 having a shape matching the inner shape of the sleeve 20. Thus, in use, the sleeve 20 is inserted into the recess 15 at the interface to the ball shaft 10 and is fitted so as to tightly line that recess 15. The cam shaft 4 is then fitted to the ball shaft such that the interface protrusion 16 fits into the recess 15 sandwiching the sleeve 20, in a tight fit, between the cam shaft and the ball shaft. The cam shaft and ball shaft are therefore tightly fitted together via the insert sleeve 20 such that rotation of the cam shaft causes rotation of the ball shaft by torque being transmitted through the joint with the insert.

Figure 5:
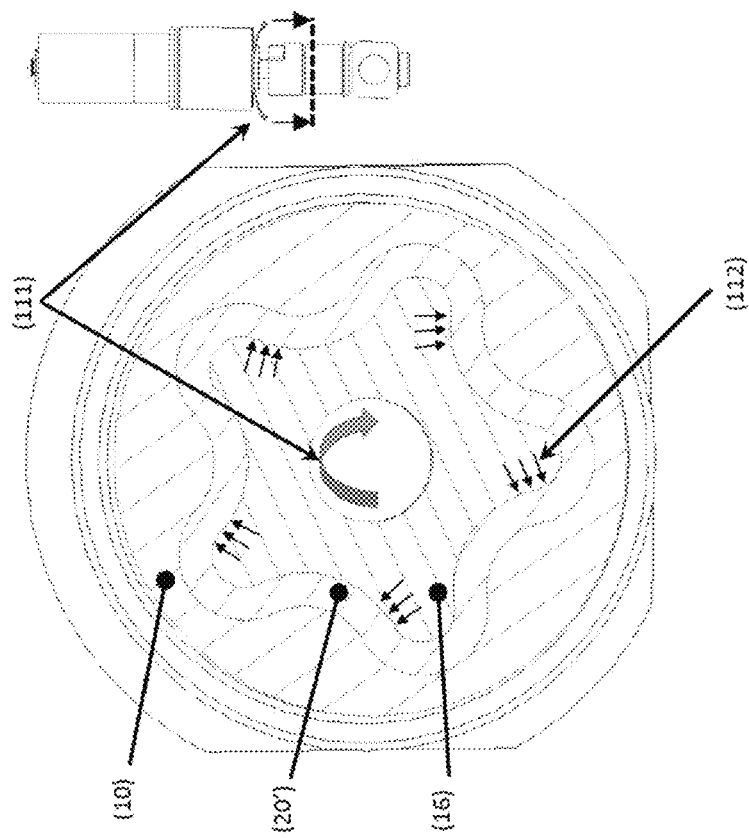
FIG. 5 show the forces acting on the assembly with an insert as shown in FIGS. 3 and 4.

As shown in FIG. 5, as the motor 1 rotates the cam shaft 4, the resulting torque 111 from the rotating protrusion 16 causes pressure loading 112 on the insert 20 which compresses and the torque is transferred to the ball shaft 10.

Figure 6:
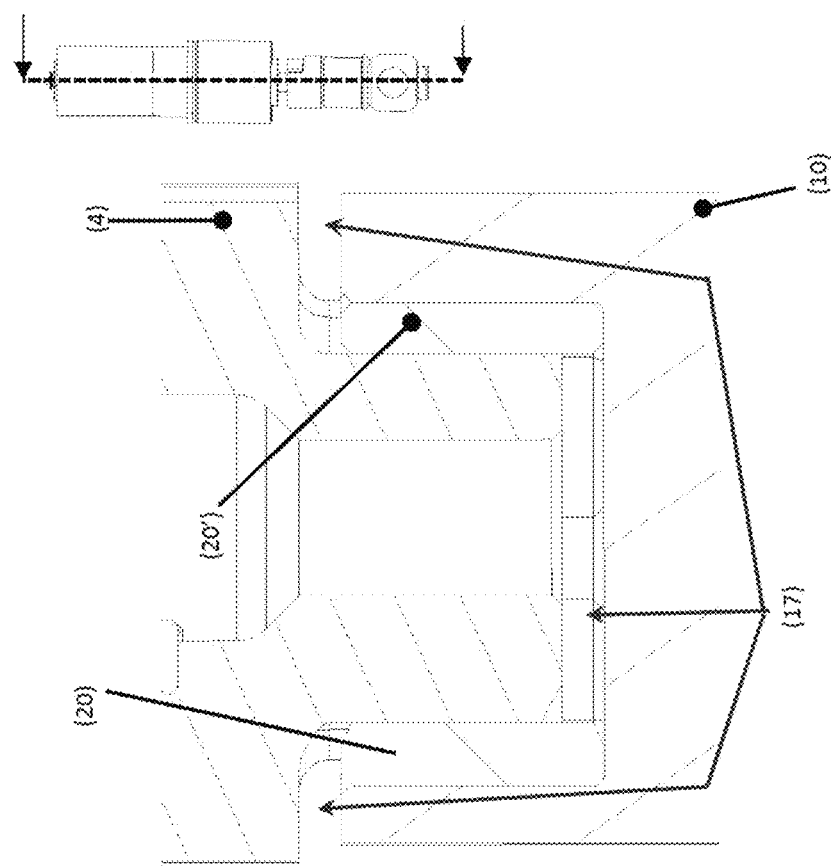
FIG. 6 is a sectional view of an assembly incorporating a dielectric insulator insert such as shown in FIGS. 3 and 4.

If the dielectric insert 20 is sized to fit fully within the recess, and not extend beyond the interface, an air gap 17 is also required to complete the dielectric barrier between the cam shaft and the ball shaft, as shown in FIG. 6.

In another example, the recess could be in the cam shaft and the protrusion could be at the interface of the ball shaft.

The example shows a corrugated sleeve with five corrugations but other designs may have different numbers of corrugations.

The insert can be quickly and easily fitted and does not require precise alignment, since it will naturally slot into the right shape even if initially located slightly out of alignment. It is therefore impossible to assemble the insert incorrectly.

Figure 7:
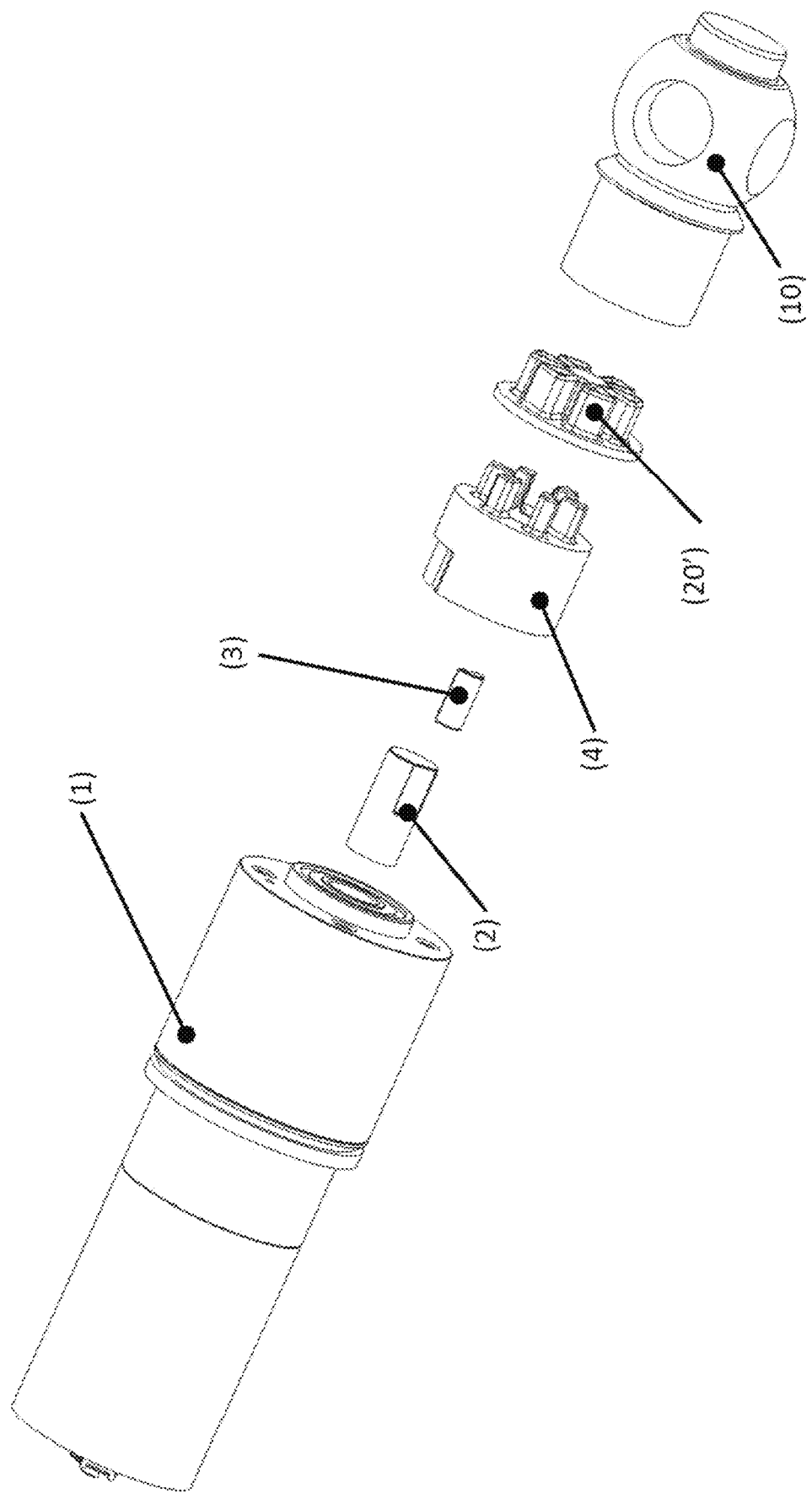
FIG. 7 is an exploded view of the assembly of FIG. 1 according to a second example.

In another example, described with reference to FIGS. 7 to 9, the insert 20' may be formed as essentially several individual sleeve structures 200 defined in a base flange 201 around a hub 202. Each of these sleeve structures 200 is shaped to closely fit over a correspondingly shaped protrusion 203 extending from the cam shaft 4 (or, alternatively, from the ball shaft interface (not shown) and to fit into a corresponding shaped recess 204 formed in the ball shaft interface or, alternatively, the cam shaft interface). The principle, however, is similar to that described in relation to the first example. The insert 20' is fitted to the ball shaft interface such that the individual sleeve structures fit into corresponding recesses 204 at the ball shaft interface. The cam shaft is then fitted to the ball shaft whereby the protrusions 203 fit into the recesses 204 such that the dielectric insert sleeve structures form a tightly fitted lining between the protrusions and the recesses and are able to transfer torque and provide a dielectric barrier in essentially the same way as the sleeve 20 described above. Again, the number and shape of the sleeve structures, recesses and protrusions can be varied.

Figure 10:
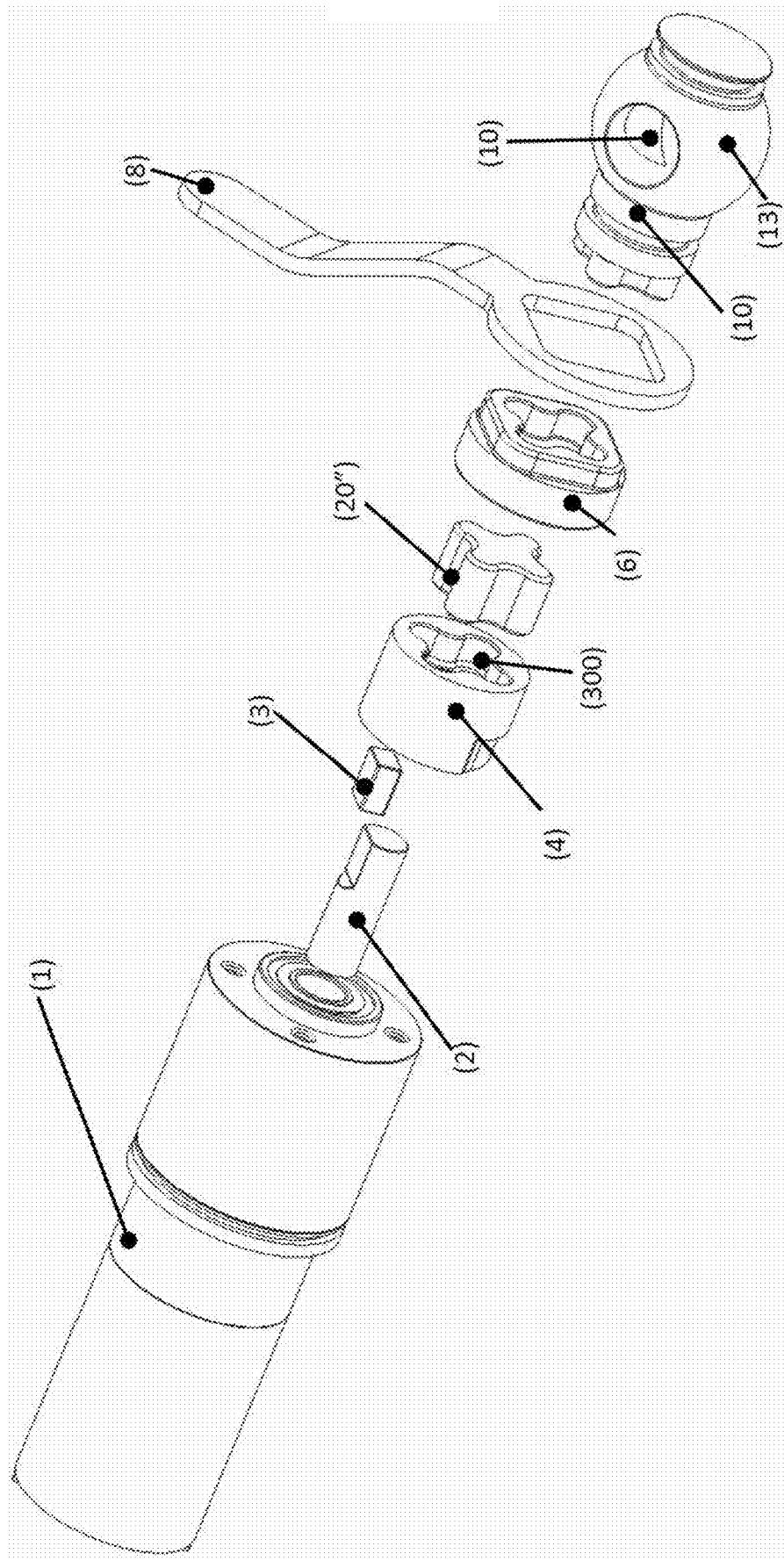
FIG. 10 is an exploded view of the assembly of FIG. 1 according to a third example.
Figure 12:
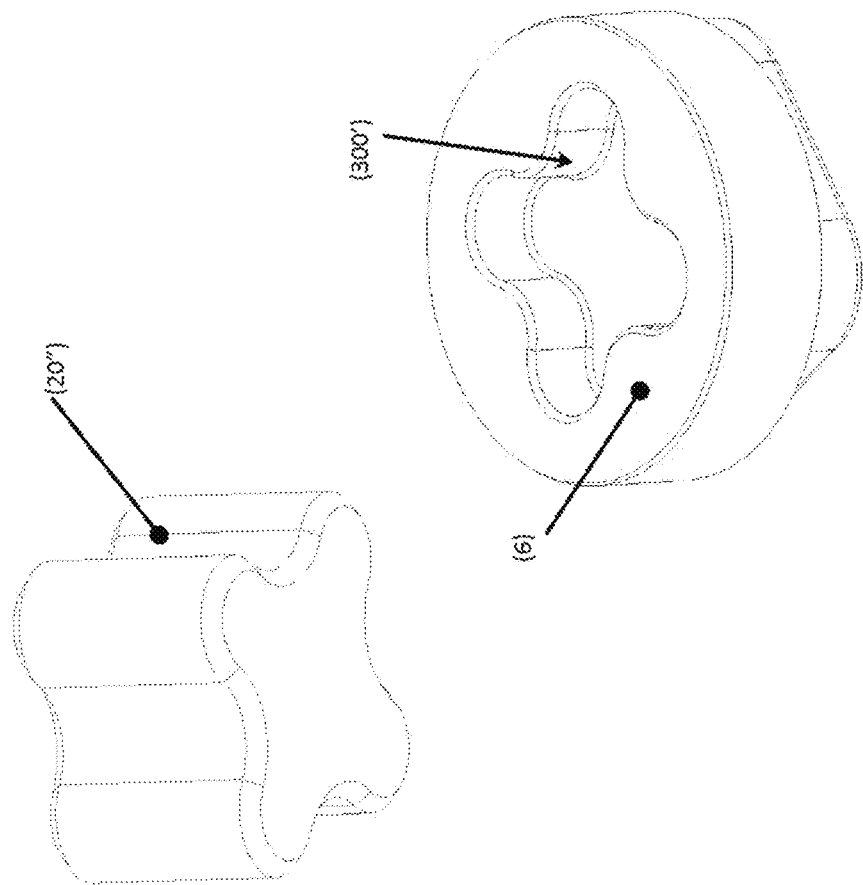
FIG. 12 shows the insert of FIG. 11 from a different perspective.
Figure 11:
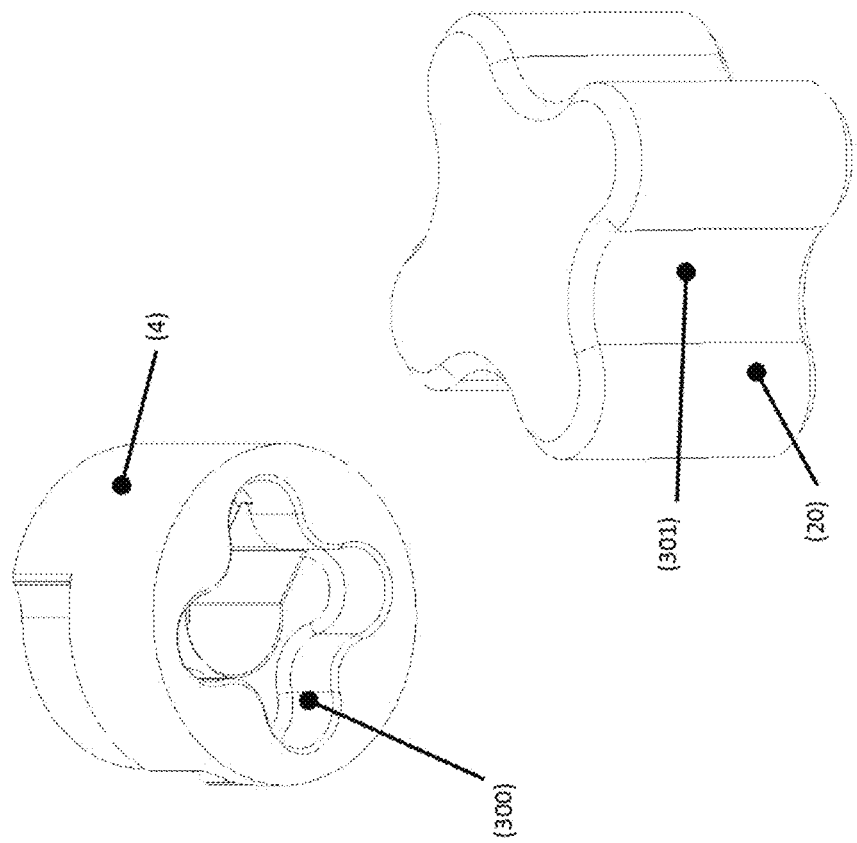
FIG. 11 is a perspective view of another example of a dielectric insulator insert for an assembly in accordance with the disclosure.

In another variation, as shown e.g. in FIGS. 10 to 12, rather than providing sleeve structures, the insert is a solid block insert 20" that engages in corresponding shaped recesses 300, 300' formed, respectively, at the cam shaft interface and the ball shaft interface. In the example shown, the ball shaft interface is provided by means of a bushing 6 mounted to the ball shaft 10 and the shaped recess 300' is formed in the bushing. It is also conceivable that the recess could be formed directly in the ball shaft. The insert 20" here has a non-circular outer shape to ensure that it can engage with the cam shaft and ball shaft interfaces so as to transmit torque. The non-circular shape may be defined by ribs or lobes or other shapes. In this example, the insert has a lobe-shape defining four (by way of example only) outer lobes. The insert has a depth, d, such that an upper part extends into the cam shaft recess 300 sufficient to enable the torque transfer and a lower part extends into the ball shaft/bushing recess 300' sufficient to enable the torque transfer. An indent or fillet 301 is formed between adjacent lobes. An optimal design in terms of strength has been found by the ratio of the diameter of the rounded fillet to the diameter of the rounded lobe being slightly less than one e.g. approximately 0.945—i.e. the rounded lobe ends have a slightly larger diameter than the diameter of the fillet between the lobes. In tests, it seems that four lobes is the minimum to sufficiently redistribute torque loading over the interface although it may be that fewer lobes may work for smaller, lower force assemblies.

Other forms of insert, not shown here, can also be envisaged, such as a double-layer sleeve filled with sand or fluid or the like that is not pre-shaped but takes up the shape of the recess/protrusions on assembly.

The dielectric insulation insert provides electrical insulation between the dry and wet parts of the motorised ball valve assembly whilst ensuring torque transfer between the shafts of the respective parts. The insert must have dielectric properties. Various dielectric materials are known and can be used, for example, but not exclusively, plastic, e.g. PEEK, G10 etc., rubber (EPDM) or aluminium with an oxidised layer on the entire outer surface as a dielectric barrier. The material selected should have superior strength in terms of compression rather than in the tension or shear directions, as the torque is transferred in the compression direction as shown in FIG. 5. Plastic and rubber materials allow the sleeve to buffer vibration or shocks sent by the motor through the system.

The dielectric barrier and compliant joint drive have been described above in the context of a ball shaft valve assembly. This is only an example of where the dielectric barrier can provide advantages and can find application. The dielectric barrier assembly of this disclosure can, however, find application in other assemblies where torque is transmitted between a drive end and a driven end. The scope of the invention is as defined by the claims.

The invention claimed is:

1. A motorized ball shaft assembly comprising:
   a drive shaft arranged to be rotated by a motor;
   a ball shaft arranged to be driven by the drive shaft; and
   a dielectric insulating insert assembly arranged to be positioned between the drive shaft and the driven shaft, the insert assembly comprising:
   a body of dielectric material to form an insulating layer and having a non-circular cross-section and configured to engage, respectively, with the drive shaft and the driven shaft in torque transfer engagement, the insulating layer providing a dielectric barrier between the drive shaft and the driven shaft;
   wherein the insert comprises a sleeve of dielectric material, and the assembly further comprising: mating interfaces at the drive shaft and the driven shaft shaped to engage with the insert in torque transfer engagement, the mating interfaces comprising a protrusion shaped to correspond to the shape of an interior of the sleeve provided at one of the drive shaft or the driven shaft and a recess shaped to correspond to the shape of an exterior of the sleeve provided at the other of the drive shaft and the driven shaft, such that the insert is sandwiched, axially, between the drive shaft and the driven shaft; or
   wherein the insert comprises a block of dielectric material having the non-circular cross section and having a depth, and wherein the drive shaft and the driven shaft are each provided with a recess to receive the insert in a close-fitting arrangement within the recesses;

wherein the insert is shaped to define a plurality of lobes, wherein the lobes have rounded ends and define, between adjacent lobes, a rounded fillet; and wherein the rounded ends have a diameter and the fillets have a diameter and the diameter of the fillets is smaller than the diameter of the rounded ends.

2. The motorized ball shaft assembly of claim 1, wherein the sleeve is shaped to define a plurality of sleeve sections each configured to fit around a corresponding one of a corresponding plurality of protrusions at the mating interface of one of the drive shaft or the driven shaft and to fit into a corresponding one of a corresponding plurality of recesses at the mating interface of the other of the drive shaft and the driven shaft.

3. The motorized ball shaft-assembly of claim 1, wherein an air gap is defined in the axial direction between the drive shaft and the driven shaft when the shafts and the insert are assembled together.

4. The motorized ball shaft assembly of claim 1, further comprising a motor arranged to drive the drive shaft.

5. The motorized ball shaft assembly of claim 4, wherein the motor is an electric motor.

6. A water supply system including the motorized ball shaft assembly of claim 1.

7. The water supply system of claim 6, being an aircraft water supply system.

* * * * *